No. 757,883. Patented April 19, 1904.

UNITED STATES PATENT OFFICE.

THOMAS W. CAPPON, OF OSSINING, NEW YORK.

CEMENTING MATERIAL AND PROCESS OF MAKING SAME.

SPECIFICATION forming part of Letters Patent No. 757,883, dated April 19, 1904.

Application filed December 2, 1903. Serial No. 183,480. (No specimens.)

*To all whom it may concern:*

Be it known that I, THOMAS W. CAPPON, a citizen of the United States, residing in Ossining, county of Westchester, State of New York, have invented a certain new and useful Improvement in Cementing Material and Process of Making the Same, of which the following is a specification.

This invention has relation to a novel cement capable of preservation for a long time in dry powdered form, but forming a hard stone or plaster when mixed with water to form a paste and allowed to set. It may be used with or without inert material or sand, although it is capable of use with a large proportion of such material for producing a very hard and durable substance.

This invention also covers the process of manufacture employed in making said material.

One object of this invention is to improve the ordinary methods used for producing ready-mixed dry mortars, while improving the product.

By the use of the present invention a cheap form of lime may be used in making mortar of this class, and at the same time double the proportion of sand hitherto admissible may be employed. The product when set is stronger than the ordinary dry mortars, the proportion of expensive plaster or calcined gypsum is reduced, and the process of manufacture is not rendered any more complicated or costly than that hitherto employed.

One very common form of comparatively poor lime found in great abundance is produced by calcining dolomite or other magnesian limestones.

I have found that all the advantages above enumerated are secured by the treatment of calcined magnesian limestones as follows: The powdered calcined magnesian limestone is mixed with sand, and the whole is sprinkled with hydrochloric acid or a suitable chlorid. This mixture is sold to be used by mere mixture with water just before applying to the walls. It is preferred to employ the hydrated calcined limestone instead of the anhydrous form, although the latter may be employed where great care is practiced in use and application of the mortar. In hydrating the calcined limestone preparatory to treatment, as above pointed out, it is best to add somewhat less than the theoretical amount of water necessary for complete slaking, although my invention covers the use of completely-hydrated material.

Where hydrochloric acid is used, as above, the binding material or slaked calcined limestone may contain as little as from twelve to fifteen per cent. of magnesium hydrate, and the proportion of commercial hydrochloric acid will then be from five parts up for every hundred parts of the combined calcium and magnesium hydrates. A first-rate result will be obtained with twelve parts slaked lime, eight parts of magnesium hydrate, and three parts commercial hydrochloric acid.

The proportions of sand, hair, and so on which can be added are various, according to the qualities of mortar desired, and I have found it possible to add as many as six or seven parts, by weight, of sand, &c., for one part, by weight, of the binding material. Various inert materials may be used instead of sand, which is not entirely inert. For instance, powdered marble or other powdered stone may be used.

Where my cement is employed with inert material or sand, the calcined magnesian limestone is mixed a little at a time with the mass of sand and the hydrochloric acid is allowed to run upon the mixture so gradually that in the great preponderance of dry material it will not cause any perceptible moisture. The commercial aqueous solution of acid of about one-third strength will be found suitable for this purpose.

To obtain the best results, the following method will be found advantageous. Instead of hydrating all the lime, a certain portion, preferably small, is preserved as a quicklime. This portion is then first mixed with the total amount of sand, &c., designed for the final mixture. During the process of mechanical mixture the hydrochloric acid or its equivalent is added in a small stream or streams, and when all of the hydrochloric acid or its equivalent has been added the remainder of the calcined material, which is in the form of hydrate, is added and thoroughly mixed through. The result of this will be to insure, as far as possible, a complete drying of the compound, and so prevent premature reaction prior to the time of actual use.

Where it is desired to have a mixture that will set rapidly, a small proportion of calcined gypsum can be added, and I have found that, say, four parts of such gypsum to twenty-one of calcined dolomite makes a very satisfactory mortar which sets in a relatively short time. The proportion of calcined gypsum can be varied according to the rapidity of set desired; but too much should not be used, as this substance is an element of weakness.

The presence of the lime in my dry mortar has a double advantage. In the first place, it promotes rapid drying during process of manufacture, as already stated, and, in the second place, the lime absorbs carbonic acid from the air after the mortar has been mixed and put in place on the walls and by its conversion into carbonate aids in the setting of the mortar.

The most important feature of this invention is found in the discovery that the presence of a considerable quantity of lime with the magnesium oxid or hydrate does not prevent the mixture herein described from possessing all the valuable qualities of a dry mortar, which is reliable for use when mixed with water. The invention covers the application of this discovery to the broadest extent warranted by the language of my claims and includes, among other things, mixtures wherein more or less lime has been added to the calcined magnesian limestone.

Instead of using hydrochloric acid, as above stated, magnesium chlorid in solution or powder can be employed, and for this purpose a twenty-five-per-cent. aqueous solution would be found most suitable. Ammonium or calcium chlorid would answer under some circumstances and are covered by my claims; but magnesium chlorid is preferred.

Hydrochloric acid may be properly described as a hydrogen chlorid and is therefore one of the chlorids suitable for the purposes above named. I have therefore used the expression "suitable chlorid" in my claims with the intention that it shall cover hydrochloric acid as well as the other chlorids above referred to or understood.

Where magnesium chlorid or its virtual equivalent is used, satisfactory results can be produced by use of about four and a half parts of the twenty-five-per-cent. aqueous solution in every twenty-one parts of calcined material. I do not limit myself to this proportion, however, and the process will be successful whenever there is a sufficient amount of chlorin, whether in a suitable chlorid or in hydrochloric acid, to produce the requisite amount of magnesium oxychlorid without any hurtful amount of calcium chlorid being formed. For this purpose there should always be an excess of hydrated magnesium in the calcined limestone to insure satisfaction of the hydrochloric acid or its equivalent and prevent formation of an excessive amount of calcium chlorid with resulting slow drying.

While this process has reference to utilization of dolomite or other magnesia-bearing calcined limestone, it is to be understood that it is applicable whether such calcined limestone is used alone or mixed with other limes. While in the above specification I have alluded to my composition of matter as a "dry mortar," it is to be understood that this invention covers the use of said material either for plastering of walls, the cementing of stone, the making of artifical-stone masses, or the manufacture of bricks.

I have determined by experiment that by using a mixture of the calcium and magnesium oxids only partly hydrated the aqueous solution of hydrochloric acid or magnesium chlorid can be added to this mixture directly without the use of sand or inert material. While I have found the proportion of thirteen parts of the aqueous solution of hydrochloric acid to one hundred parts of the hydrates and oxids to give good results, I do not limit myself to this proportion, as it may be greatly varied for production of different grades of material. I find that where the aqueous solution is thus added without the use of inert material or sand the drying action of the oxids is so great as to prevent the immediate formation of oxychlorids of magnesia to a very considerable extent indeed, sufficiently to produce a practically dry active powder capable when mixed with water to form a paste setting with great hardness. A stone somewhat resembling ivory in appearance is produced in this way, and it is to be understood that this invention is therefore not limited to the composition of matter containing sand or inert material.

It is to be understood that my broad invention applies to the use of calcined calcium carbonate mixed with calcined magnesium carbonate whether or not these carbonates are found already associated in nature in a magnesian limestone.

My invention also applies to those cases wherein water is added to the ingredients named for use as a mortar or cement at once.

What I claim is—

1. The process of forming a cementing material which consists in hydrating to a considerable extent a mixture of calcium and magnesium oxids and adding thereto a suitable proportion of a suitable chlorid, whereby an oxychlorid of magnesium is formed; substantially as described.

2. The process of forming a cementing material which consists in calcining magnesian limestone, then hydrating the same to a considerable extent and then adding to the unchanged resultant product a suitable proportion of hydrochloric acid or a suitable chlorid, substantially as described.

3. The process of manufacturing mortar which consists in adding a suitable proportion of sand or powdered stone to a cementing material formed by adding a suitable chlorid to a mixture of magnesium and calcium oxids hydrated to a considerable extent; substantially as described.

4. The process of manufacturing cementing material which consists in sprinkling a solution of a suitable chlorid upon a mixture of magnesium and calcium oxids hydrated to a considerable extent, while said mixture is in a state of agitation; substantially as described.

5. The process of manufacturing dry mortars which consists in mixing with sand or powdered stone a certain proportion of quicklime containing a magnesium oxid, then adding a proper proportion of aqueous solution of a suitable chlorid and finally completing the mixture by adding a suitable proportion of hydrated calcium and magnesium oxids hydrated to a considerable extent, substantially as described.

6. A dry mortar comprising a large proportion of sand or powdered stone, mixed with calcium and magnesium oxids hydrated to a considerable extent and a suitable chlorid; substantially as described.

7. The process of making a cement-powder, which consists in adding a suitable chlorid to a mixture of hydrates of magnesium and calcium with anhydrous oxids of the same bases; substantially as described.

8. A cementing material consisting of powdered hydrates and oxids of magnesium and calcium mixed with powdered chlorids capable, when dissolved in water of reacting with said magnesium hydrates and oxids to form oxychlorids of magnesium, substantially as described.

9. The process of manufacturing cementing material which consists in adding commercial hydrochloric acid to a mixture of more or less hydrated calcium and magnesium oxids in approximately the proportions of three parts acid, twelve parts calcium compound and eight parts magnesium compound, substantially as described.

THOMAS W. CAPPON.

Witnesses:
H. S. MacKaye,
Florence Pick.